(12) United States Patent
Du et al.

(10) Patent No.: US 8,182,959 B2
(45) Date of Patent: May 22, 2012

(54) TUBULAR ELECTROCHEMICAL CELL

(75) Inventors: Yanhai Du, East Amherst, NY (US);
Caine Finnerty, Buffalo, NY (US)

(73) Assignee: CP SOFC IP, LLC, Ann Arbor, MI (US)

( * ) Notice: Subject to any disclaimer, the term of this patent is extended or adjusted under 35 U.S.C. 154(b) by 957 days.

(21) Appl. No.: 11/983,054

(22) Filed: Nov. 6, 2007

(65) Prior Publication Data

US 2009/0117435 A1    May 7, 2009

(51) Int. Cl.
*H01M 8/10*    (2006.01)

(52) U.S. Cl. .................. 429/497; 429/486; 429/496

(58) Field of Classification Search .................. 429/497, 429/486, 491, 496
See application file for complete search history.

(56) References Cited

U.S. PATENT DOCUMENTS

| | | | |
|---|---|---|---|
| 4,454,207 A * | 6/1984 | Fraioli et al. .................. | 429/425 |
| 6,063,517 A | 5/2000 | Montemayor et al. | |
| 7,416,802 B2 * | 8/2008 | Sammes et al. ............... | 429/466 |
| 2004/0126636 A1 | 7/2004 | Horiuchi et al. | |
| 2004/0247970 A1 | 12/2004 | Irvine et al. | |

FOREIGN PATENT DOCUMENTS

| | | |
|---|---|---|
| DE | 197 39 019 A1 | 3/1999 |
| DE | 10 2005 004 048 A1 | 8/2006 |
| DE | 102005004048 * | 8/2006 |
| EP | 1 394 885 A1 | 3/2004 |
| WO | 2004/093235 | 10/2004 |

OTHER PUBLICATIONS

Jones et al., "Co-Fired SOFC Electrode-Electrolyte-Electrode Membrane Rolls, Combining Tubular and Planar Technologies," 5th European Solid Oxide Fuel Cell Forum, Jul. 1, 2002-Jul. 5, 2002, Lucerne, Switzerland, 1:123-131 (2002).

* cited by examiner

*Primary Examiner* — Ula C. Ruddock
*Assistant Examiner* — Thomas H. Parsons
(74) *Attorney, Agent, or Firm* — K&L Gates LLP

(57) ABSTRACT

The present teachings relate to an electrochemical cell having a closed Fermat spiral shape. The electrochemical cell comprises an anode, a cathode, an electrolyte, a fuel channel, an oxidant channel, and optionally a reforming layer. The electrochemical cell can be made through extrusion, gel-casting, or 3-D printing. The electrochemical cell can be a solid oxide fuel cell.

14 Claims, 6 Drawing Sheets

TUBULAR ELECTROCHEMICAL CELL

Electrochemical devices, such as fuel cells, oxygen pumps, sensors and the like, generally offer opportunities for an efficient conversion of chemical energy to electrical power with minimal pollution. Electrochemical devices generally comprise an electrochemical cell, which is available in planar, tubular, or monolithic designs. The various designs suffer from several drawbacks, e.g., slow start-up for planar solid oxide fuel cells ("SOFCs") and lower volumetric power density for tubular SOFCs.

Although tubular cell designs have demonstrated adequate thermal shock resistance and high mechanical strength, they can have low volumetric power packing density relative to other cell designs. For example, in order to generate an equivalent amount of power, a tubular electrochemical cell is generally much larger in size than a planar or monolithic electrochemical cell. One of the drawbacks of increasing the size of an electrochemical cell (i.e., the diameter or the length) to generate larger amounts of power is lower volumetric power density. However, reducing the size of the tubular cell can increase the volumetric power density of an electrochemical cell stack containing many tubular cells. Unfortunately, too many cells in a stack can complicate operation and increase manufacturing costs.

There is, therefore, a need for improving the power and voltage performance of tubular electrochemical cell.

SUMMARY

In satisfaction of this need and others, the present teachings relate to an electrochemical cell comprising an anode layer, a cathode layer, an electrolyte layer in ionic or protonic communication with one of the anode layer and the cathode layer, a fuel channel bounded by the anode layer, and oxidant channel bounded by the cathode layer, wherein the anode layer, the electrolyte layer, and the cathode layer together substantially form a closed Fermat spiral.

Another embodiment of the present teachings relates to an electrochemical cell comprising an electrolyte layer interposed between an anode layer and a cathode layer to form a multilayer member, where the multilayer member substantially can form a closed Fermat spiral comprising a fuel channel and an oxidant channel. The anode layer, the cathode layer, and the electrolyte layer each can have a substantially planar dimension and the anode layer and the cathode layer can be in at least one of ionic and protonic communication with the electrolyte. The fuel channel can comprise an inner boundary formed by the anode layer and an outer boundary formed by the anode layer. The oxidant channel can comprise an inner boundary formed by the cathode layer and an outer boundary formed by the cathode layer.

In some embodiments, the anode layer also can have a reforming layer. The anode layer, the electrolyte layer, and the cathode layer each can have a width between about 5 μm and about 2 mm. The electrochemical cell can be an anode-supported electrochemical cell, a cathode-supported electrochemical cell, an electrolyte-supported electrochemical cell, a metal-supported electrochemical cell, or a substrate-supported electrochemical cell. The fuel channel and the oxidant channel each can have a width between about 0.1 mm and about 5 mm. The electrolyte layer can comprise an ionic conductor or a protonic conductor. In certain embodiments, the electrochemical cell can be a solid oxide fuel cell.

Another aspect of the present teachings relates to a method of making an electrochemical cell. The method can include forming a first layer substantially into a closed Fermat spiral wherein the first layer can have a first side and a second side, associating a second layer with at least a portion of the first side of the first layer, and associating a third layer with at least a portion of the second layer. In some embodiments, the first layer can be pre-fired. In some embodiments, the first layer and the second layer can be fired. In some embodiments, the entire electrochemical cell can be fired. The first layer can be formed by extruding, gel-casting, 3-D printing, or rolling a pre-form tape. The second layer can be associated with the first layer by dip coating or gel-casting. The third layer can be associated with the second layer by dip-coating or gel-casting. The second side of the first layer can be masked to facilitate the application of the second layer and the third layer. In some embodiments, the first layer and the third layer each can comprise an electrode material and the second layer can comprise an electrolyte material. In some embodiments, a reforming catalyst can be associated with the second side of the first layer or the exposed side of the third layer. In some embodiments a fourth layer can be associated with the third layer, where the first layer is a support, the second and fourth layers are electrode and the third layer is an electrolyte.

In certain embodiments, a method of making an electrochemical cell comprises forming an electrolyte layer substantially into a closed Fermat spiral wherein the electrolyte layer can have a first side and a second side, associating a cathode layer with at least a portion of the first side of the electrolyte layer, and associating an anode layer with at least a portion of the second side of the electrolyte layer.

Another aspect of the present teachings relates to a method of operating an electrochemical cell. In some embodiments, a method of operating a substantially cylindrical electrochemical cell comprises causing a fuel to flow through the electrochemical cell, wherein the fuel enters the electrochemical cell at a first average fuel radius and exits at a second average fuel radius and causing an oxidant to flow through the electrochemical cell, wherein the oxidant enters the electrochemical cell at a first average oxidant radius and exits at a second average oxidant radius. In some embodiments, the fuel and the oxidant flow can flow in the same axial direction. In certain embodiments, the fuel and the oxidant can flow in opposite axial directions. In some embodiments, the first average fuel radius is smaller than the second average fuel radius and the first average oxidant radius is smaller than the second average oxidant radius.

In various embodiments, a method of operating an electrochemical cell comprises directing a fluid through an electrochemical cell, wherein the electrochemical cell is substantially cylindrical and has an axial length, and wherein the fluid has a concentration, and varying the concentration of the fluid radially along at least part of the axial length of the electrochemical cell.

In certain embodiments, a method of operating a substantially cylindrical electrochemical cell comprises directing a fuel stream into the electrochemical cell approximately along an axis of the electrochemical cell, and exposing the fuel stream within the electrochemical cell to an increasing anode surface area along at least a portion of the axial length of the electrochemical cell.

BRIEF DESCRIPTION OF THE DRAWINGS

It should be understood that the drawings are not necessarily to scale, with emphasis generally being placed upon illustrating the principles of the present teachings. The drawings are not intended to limit the scope of the present teachings in any way.

DETAILED DESCRIPTION OF THE PRESENT TEACHINGS

Figure 1:
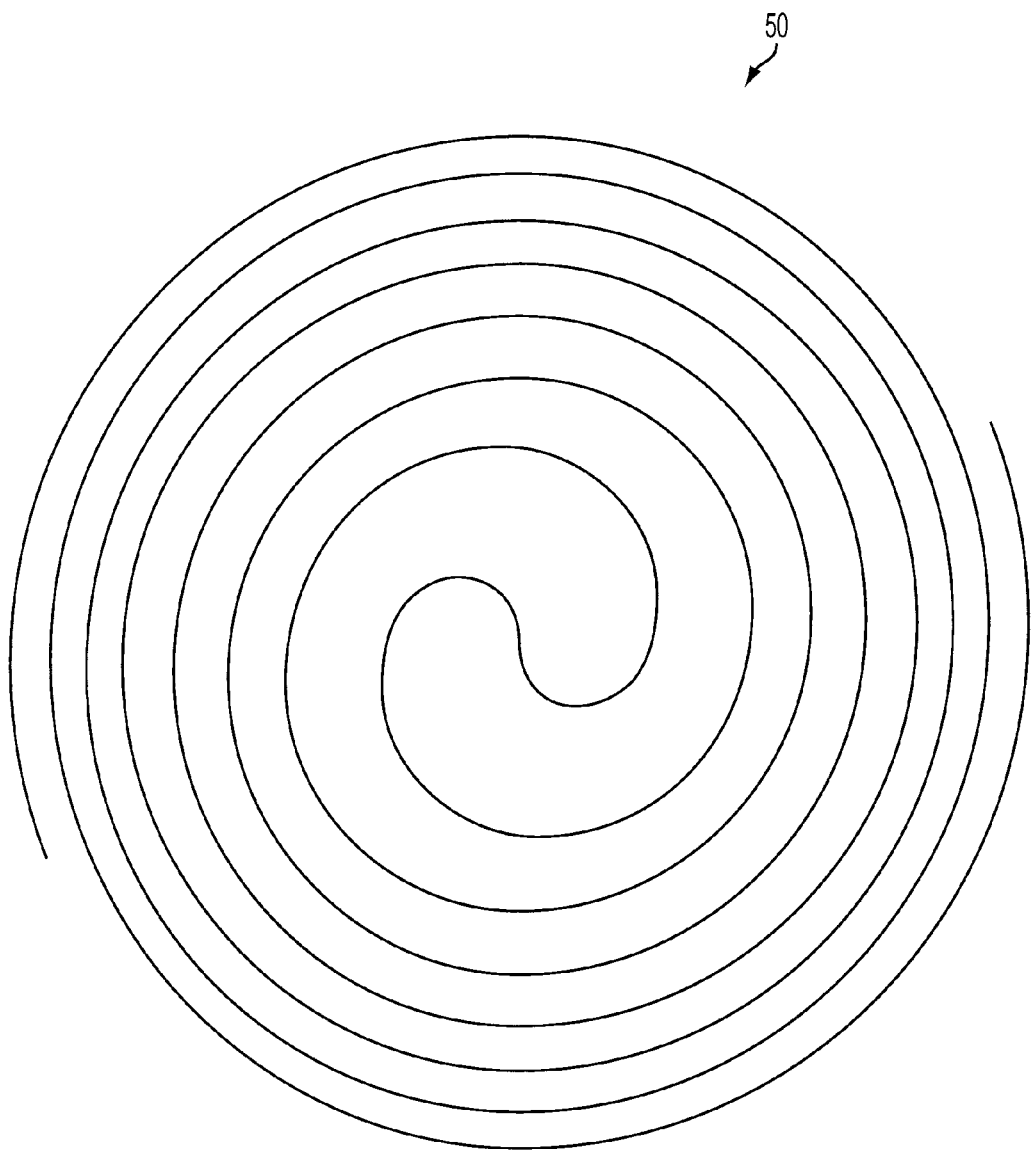
FIG. 1 is a schematic of a Fermat spiral.

The present teachings can provide an electrochemical cell with improved power and voltage performance, as well as fuel utilization, without an increase in the outer dimensions of the electrochemical cell. For example, the present teachings include a tubular electrochemical cell having an internal structure representative of a Fermat spiral. In an embodiment, the internal structure is a substantially planar multilayer member—comprising an anode, cathode and electrolyte—representative of a closed Fermat spiral shape so that a fuel channel and an oxidant channel are formed on either side of the multilayer member. The present teachings can be used to design an electrochemical cell with a higher volumetric power density as compared to a prior art tubular electrochemical cell of the same outer dimensions.

Throughout the description, where devices or compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps. It should be understood that the order of steps or order for performing certain actions is immaterial so long as the method remains operable. Moreover, two or more steps or actions can be conducted simultaneously.

In the application, where an element or component is said to be included in and/or selected from a list of recited elements or components, it should be understood that the element or component can be any one of the recited elements or components and can be selected from two or more of the recited elements or components. Further, it should be understood that elements and/or features of a composition, an apparatus, or a method described herein can be combined in a variety of ways without departing from the spirit and scope of the present teachings, whether explicit or implicit herein.

It is to be understood that the figures and descriptions of the present invention have been simplified to illustrate elements that are relevant for a clear understanding of the present teachings while eliminating, for purposes of clarity, other elements. For example, certain details relating to extrusion, gel-casting, or 3-D printing are not described herein. Those of ordinary skill in the art will recognize, however, that these and other manufacturing techniques may be useful to create complex shapes. A detailed discussion of such techniques is not provided because such techniques are well known in the art and because they do not facilitate a better understanding of the present teachings.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise.

In the following discussion of illustrative embodiments, the term "Fermat spiral" generally refers to a parabolic spiral, such as a spiral 50 shown in FIG. 1. The spiral 50 is a Fermat spiral, a type of Archimedean spiral, that follows the equation $$r = \pm \theta^{1/2}$$

in polar coordinates (the more general Fermat's spiral follows $r^2 = a^2 \theta$). Those skilled in the art will appreciate that variations of the Fermat spiral may be used without departing from the principles of the present teachings.

Figure 2:
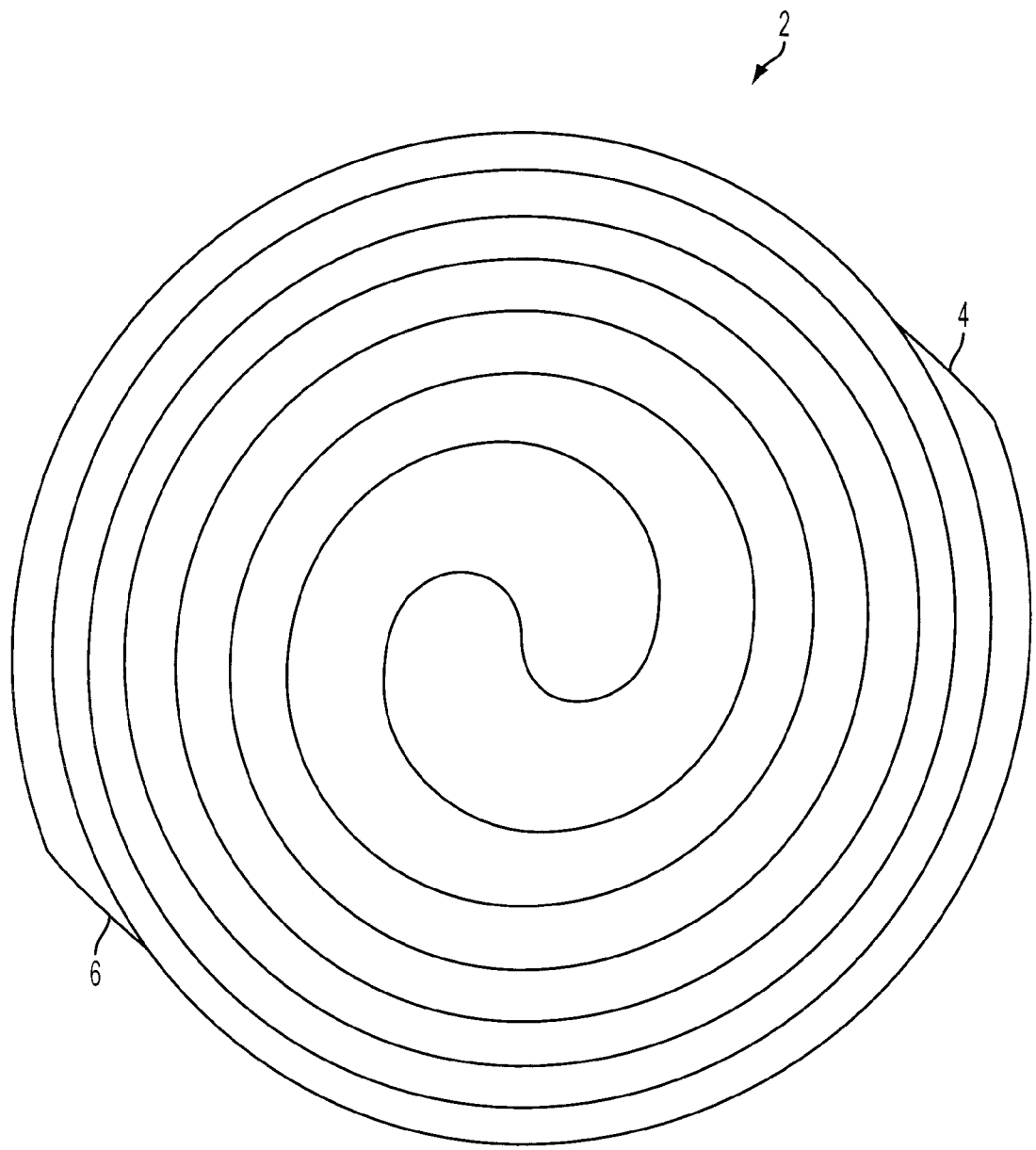
FIG. 2 is a schematic of a closed Fermat spiral.

The term "closed Fermat spiral" refers to a Fermat spiral in which the spiral closes upon itself, such as in the manner shown in FIG. 2. FIG. 2 shows an exemplary closed Fermat spiral 2 in which a first end 4 and a second end 6 are closed.

Figure 3:
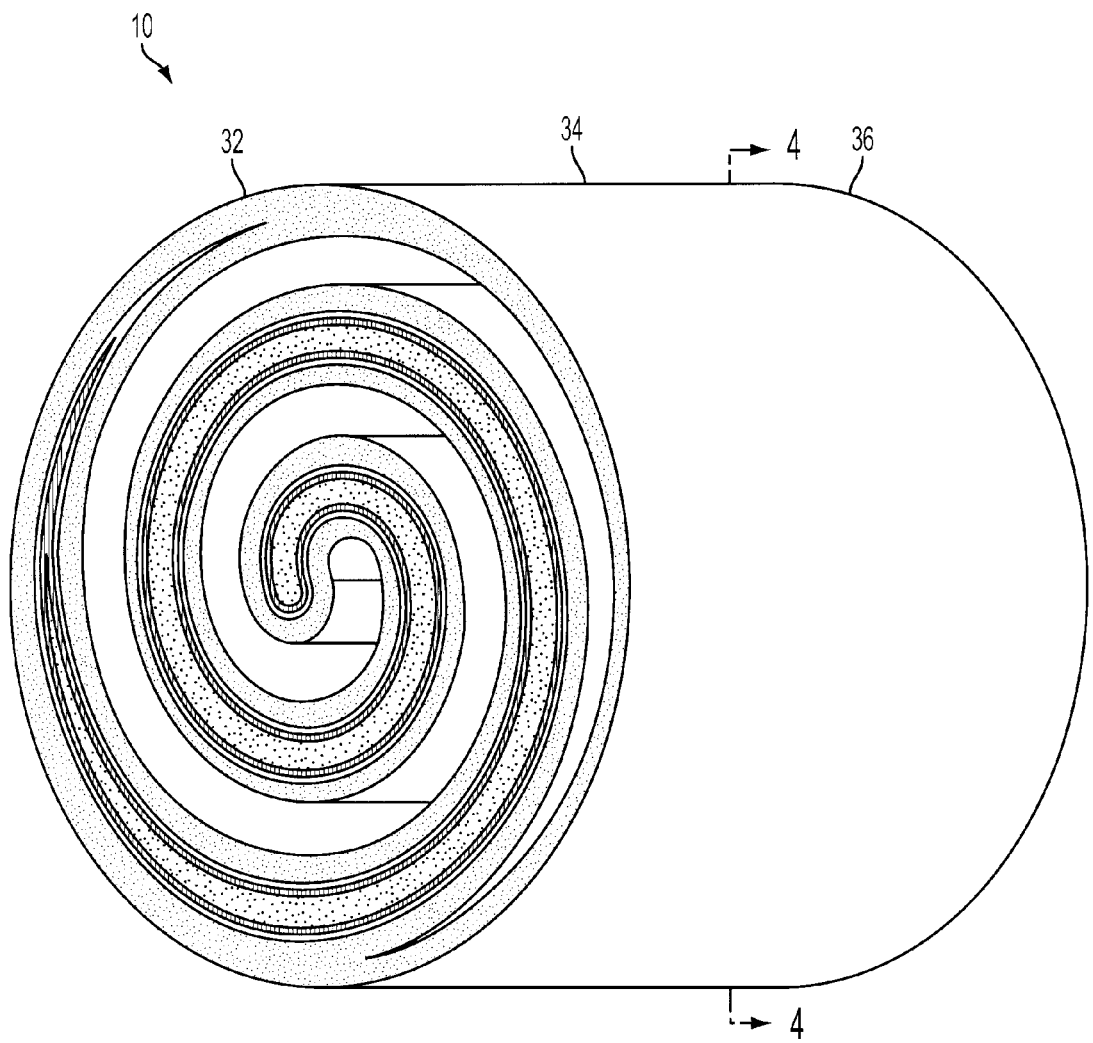
FIG. 3 is schematic perspective view of an embodiment of an electrochemical cell according to the present teachings.

FIG. 3 is schematic perspective view of an exemplary electrochemical cell 10 having a generally cylindrical shape and a cross section representative of a closed Fermat spiral according to the present teachings. As shown, the electrochemical cell 10 includes a first end 32, a midpoint 34, and a second end 36.

The electrochemical cell can be any type of electrochemical cell known in the art including, for example, a fuel cell or an electrolytic cell. The present teachings encompass fuel cells that operate at a wide range of temperatures, including high temperature cells (e.g., solid oxide fuel cells and molten carbonate fuel cells) and low-temperature cells (e.g., phosphoric acid fuel cells and proton exchange membrane fuel cells).

Figure 4:
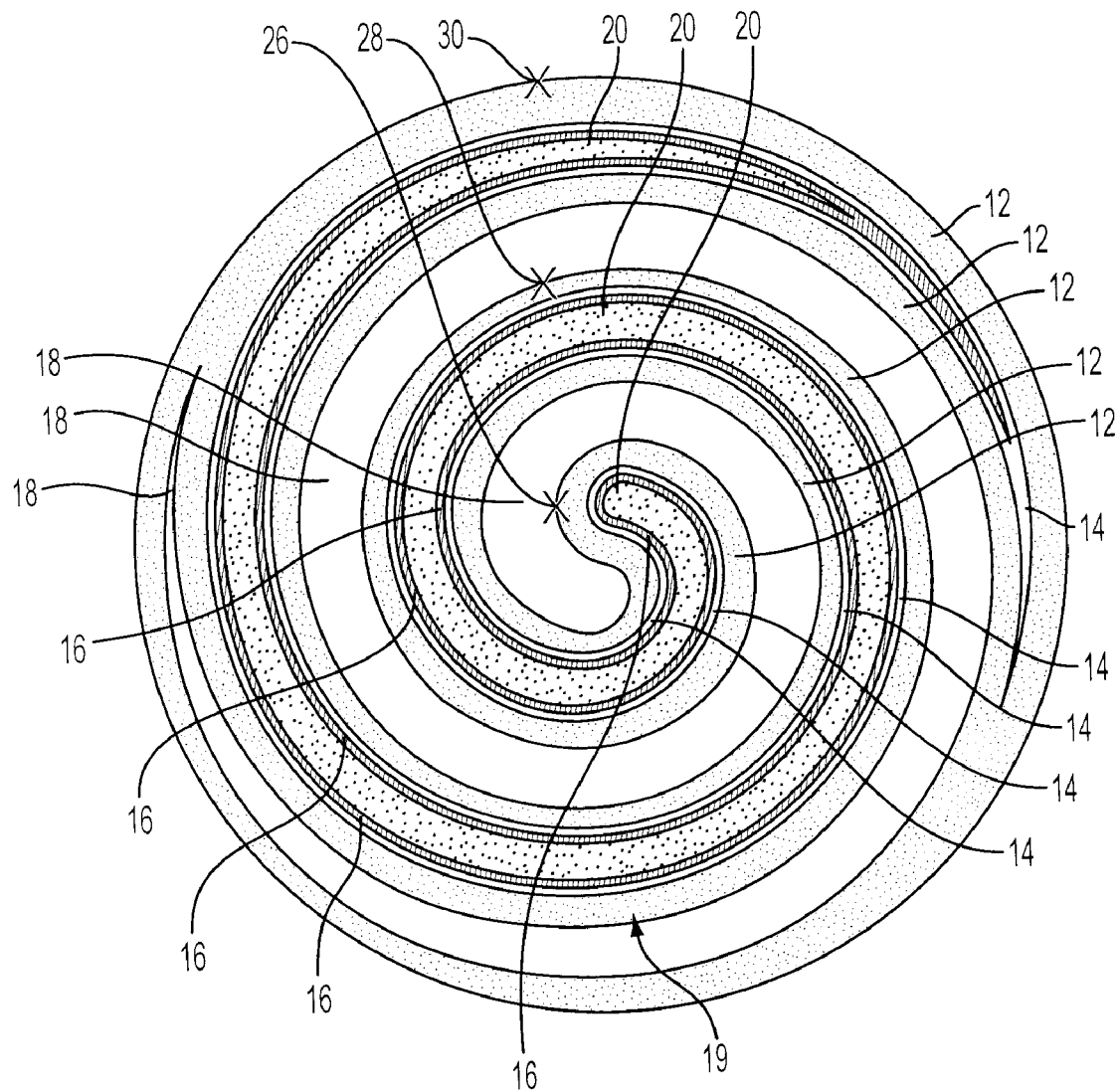
FIG. 4 is a cross-sectional view at 4-4 taken perpendicular to the longitudinal axis of the electrochemical cell illustrated in FIG. 3.

FIG. 4 is a cross-sectional view at 4-4 taken perpendicular to the longitudinal axis of the electrochemical cell illustrated in FIG. 3. The electrochemical cell 10 can include an anode 12, an electrolyte 14, a cathode 16, a fuel channel 18 (bounded by the anode 12), and an oxidant channel 20 (bounded by the cathode 16). In the illustrated embodiment, the electrolyte 14 is interposed between the anode 12 and the cathode 16 so that, together, the anode 12, the electrolyte 14, and the cathode 16 form a multilayer member 19. The multilayer member 19, in turn, has a substantially cylindrical shape and exhibits a cross-section representative of a closed Fermat spiral. As shown, the electrochemical cell 10 also includes a radial center 26, a half-radius 28, and a radius 30. In operation, an oxidant, such as air, flows through the oxidant channel 20 and fuel flows through the fuel channel 18 either in the same or an opposite axial direction. Oxidant molecules in the oxidant channel 20 permeate the cathode 16 and contact the electrolyte 14 where, in the case of an ionic conductor, oxygen ions are formed. The oxygen ions diffuse into the electrolyte 14 and migrate to the other side of the multilayer member 19 where they encounter the anode 12 and fuel flowing through the fuel channel 18.

The anode layer, (i.e., the anode) can have a substantially planar dimension, with a width ranging from about 5 μm to about 2,000 μm. The electrochemical cell can be anode-supported in that the anode is the load-bearing structure, e.g., has the greatest mechanical strength among the anode, the cathode, and the electrolyte. In an anode-supported embodiment, the anode can have a width in the range of about 0.5 mm to about 2 mm. According to such an embodiment, the electrolyte can have a width of about 5 μm to about 50 μm, and the cathode can have a width of about 10 μm to about 100 μm.

Compositionally, the anode can be made from any suitable porous electrode material known in the art. For example, the anode can be made from a ceramic material or a cermet material. The ceramic material or the ceramic component in the cermet material can include, for example, a zirconia-based material or a ceria-based material. Exemplary materials include, but are not limited to, stabilized zirconia (e.g., yttria-stabilized zirconia, particularly $(ZrO_2)_{0.92}(Y_2O_3)_{0.08}$) and doped ceria (e.g., gadolinium-doped ceria, particularly $(Ce_{0.90}Gd_{0.10})O_{1.95}$). In the case of cermet materials, the metallic component can include one or more transition metals, their alloys, and/or physical mixtures. The metallic component (e.g., Ni, Co, Cu, Ag, and W) can be introduced in the form of an oxide or a salt (e.g., NiO, $Ni(NO_3)_2$), and can be present in a range from about 30.0 vol. % to about 80.0 vol. % based on the total volume of the cermet material. For example, the anode can be a porous nickel cermet with yttria-stabilized zirconia. Other suitable electrode materials include alumina and/or titanium oxide based ceramics that may or may not include a metallic component.

In various embodiments, the anode layer also can comprise a reforming layer, as disclosed in co-pending U.S. Ser. No. 11/880,105, which is herein incorporated by reference, in its entirety. The reforming layer can contain a partial oxidation reforming catalyst, a steam reforming catalyst and/or an autothermal reforming catalyst. The reforming layer and electrolyte layer can be associated with opposite sides of the anode layer, either in whole or in part. Those skilled in the art will appreciate that the reforming layer can be associated with the anode layer of the electrochemical cell, whether the cell is anode-supported, cathode-supported, electrolyte-supported or substrate-supported.

The cathode layer (i.e., cathode) can have a substantially planar dimension, with a width ranging from about 5 μm to about 2 mm. The electrochemical cell can be cathode-supported. For a cathode-supported electrochemical cell, the cathode can have a width in the range of about 0.5 mm to about 2 mm. In a cathode-supported electrochemical cell, the electrolyte can have a width of about 5 μm to about 50 μm, and the anode can have a width of about 5 μm to about 100 μm. The cathode can be any electrically conductive, porous material known in the art. Examples of suitable cathode materials include various perovskites such as, but not limited to, lanthanum manganite perovskite ceramics, lanthanum ferrite perovskite ceramics, praseodymium manganite perovskite ceramics, and praseodynium ferrite perovskite ceramics.

The electrolyte layer (i.e., electrolyte) can have a substantially planar dimension, with a width ranging from about 5 μm to about 2,000 μm. The electrochemical cell can be electrolyte-supported. For an electrolyte-supported electrochemical cell, the electrolyte can have a width in the range of about 0.1 mm to about 2 mm. In the electrolyte-supported electrochemical cell, the anode can have a width of about 5 μm to about 100 μm, and the cathode can have a width of about 5 μm to about 100 μm.

The electrolyte layer (i.e., electrolyte) can be any ionically or protonically conductive material. In some embodiments, the electrolyte can be made from ceramic or cermet materials.

An ionic conductor permits the transfer of ions through the electrolyte layer. Ionic conductors are solid state electrical conductors that are conductive because of the movement of ions through void spaces in the conductor's crystal lattice. Suitable ionic conductor materials include fluorite-structured electrolytes, zirconia-based oxide ion conductors, ceria-based oxide ion conductors, perovskite-structured electrolytes, and Brownmillerites.

A protonic conductor permits the transfer of protons through the electrolyte layer. A protonic conductor is an electrolyte, such as a solid electrolyte, in which movable hydrogen ions (protons) are the primary charge carriers. Proton conductors may be composed of a polymer or a ceramic. Suitable protonic conductor materials include $BaCeO_3$-based compounds; $SrZrO_3$ based compounds; $CaZrO_3$ based compounds; $BaThO_3$ and $BaTbO_3$ doped with Gd; $BaTh_{0.9}Ga_{0.1}O_3$, $Sr_2Gd_2O_5$; and $Sr_2Dy_2O_5$. In various embodiments, the electrolyte layer can be made from a doped ceramic, such as a thin and dense layer of doped zirconia.

The fuel channel permits the delivery of fuel to the anode. The fuel channel can have a width between about 0.1 mm to about 5 mm, defined by the spacing between the anode layers, as shown in FIG. 4. In this way, the fuel channel has an inner boundary formed by the anode layer and an outer boundary formed by the anode layer. Those skilled in the art will appreciate that the fuel channel can be configured to receive fuel at either end of the electrochemical cell.

The oxidant channel permits the delivery of oxidant to the cathode. The oxidant channel can have a width between about 0.1 mm to about 5 mm, defined by the spacing between the cathode layers, as shown in FIG. 4. In this way, the oxidant layer has an inner boundary formed by the cathode layer and an outer boundary formed by the cathode layer. Those skilled in the art will appreciate that the oxidant channel can be configured to receive oxidant at either end of the electrochemical cell.

The electrochemical cell can also include a support layer, in addition to the anode, cathode, and electrolyte, for mechanical support of the cell. Exemplary support materials can include cermets, ceramics, for example, alumina, zirconia, and lathanium chromite; and metals.

Figure 5:
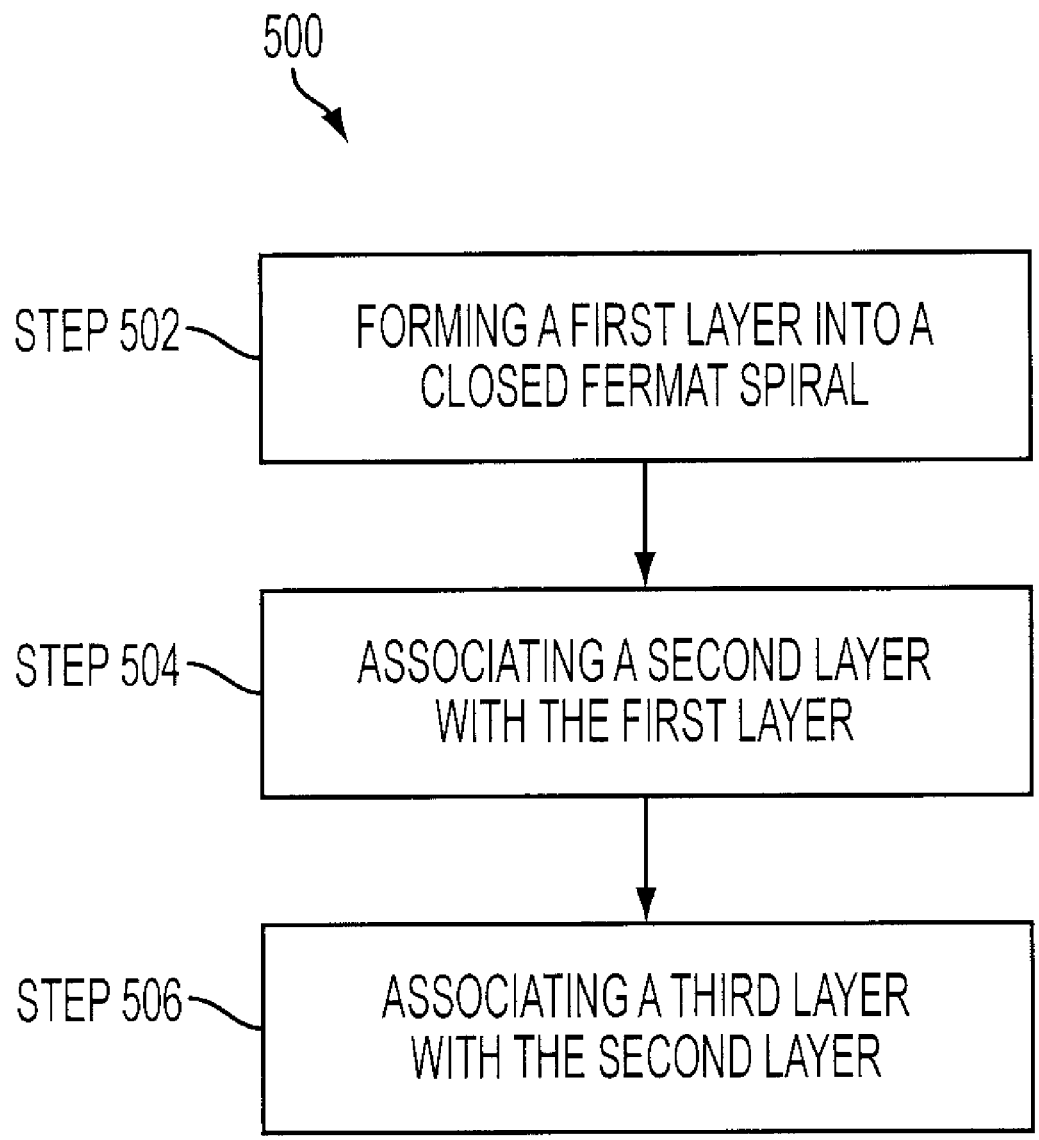
FIG. 5 is a high-level flow chart of an embodiment of a method of manufacturing the electrochemical cell of the present teachings.

FIG. 5 depicts a flow diagram of an exemplary method 500 of manufacturing an electrochemical cell according to the present teachings. In step 502, a support structure or first layer is formed in the shape of a Fermat spiral using techniques known to those skilled in the art, including extrusion, gel-casting, or 3-D printing. Step 502 also can include firing the first layer at the appropriate temperature to create a solid support.

Extrusion is a manufacturing process used to create objects of a fixed cross-sectional profile. The first layer can be pushed and/or drawn through a die of the desired profile shape, i.e., a closed Fermat spiral.

Gel-casting is a forming process similar to slip casting for making complex shapes. In gel-casting, a slip of ceramic powders is combined with a solution of organic monomers and introduced into a mold. The contents of the mold can be polymerized to form a strong, cross-linked structure. The mold can be made from various materials including metals and organic materials (i.e., wax, polymer, and graphite.). With an organic mold, demolding is not necessary, as the organic mold can be burned off during the heat treatment. In accordance with the present teachings, the mold can be in the shape of a Fermat spiral.

Three dimensional printing (3-D printing) refers to building of a desired shape in layers. Using a computer model of the shape or desired part, a slicing algorithm generates detailed information for each layer. Each layer begins with a thin distribution of powder spread over the surface of a powder bed. Using a technology similar to ink-jet printing, a binder material selectively joins the powder particles where the layer is to be formed. A piston, which supports the powder bed and the part-in-progress, lowers so that the next powder layer can be spread and selectively joined. This layer-by-layer process repeats until the part is completed. After removing the unbound powder, a heat treatment may be necessary to burn the binder, increase the part strength, and/or create desirable structure for the next processing step.

In step 504, after the first layer has been formed and, in some embodiments, fired, a second layer can be associated with at least a portion of a first side (i.e., the opposite side to which the reforming layer was applied) of the first layer or the entire first layer. The second layer can be associated with the first layer through dip coating, gel-casting, or other thin film application means.

Dip coating comprises preparing a solution of the second layer materials and dipping the first layer into the solution, coating the anode with the second layer. Certain areas of the first layer can be masked to limit coating to certain areas. The mask can be tape, wax, or any other material or method known to one of skill in the art that protects the masked areas from exposure to the solution. For example, if the first layer is to be coated with the second layer on the first side of the first layer, the second side of the first layer can be masked so that solution will expose only the first side of the first layer. After the second layer has been associated with the first side of the first layer, the masking can be removed and both the second layer and the first layer can be fired.

In step 506, a third layer can be associated with the second layer. The third layer can be associated with at least a portion of the second layer or the entire second layer. The third layer can be associated with the second layer in the same manner as was described above for associating the second layer with the first layer: dip coating, gel-casting, or other thin film application means. After the third layer has been associated with the second layer, the entire electrochemical cell can be fired.

If the first layer is a substantially planar anode layer having a first side and a second side, a reforming layer can be applied to the second side of the anode in the same manner as described above for associating the second layer with the first layer.

In various embodiments, the first and third layers can be an electrode and the second layer can be an electrolyte. In some embodiments, the first layer can be an anode, the third layer can be a cathode, and the second layer can be an electrolyte, creating an anode-supported electrochemical cell. In some embodiments, the first layer can be a cathode, and the third layer can be an anode, and the second layer can be an electrolyte, creating a cathode-supported electrochemical cell. In the cathode-supported electrochemical cell, a reforming layer can be associated with the third layer, i.e., the anode layer as discussed above.

In some embodiments, the first layer is an electrolyte and the second and third layers are electrodes, both associated with the first layer, creating an electrolyte-supported electrochemical cell. The second layer and the third layer can be associated with the first layer using dip coating, gel-casting, or other thin film application means, as described above. If the third layer is the anode layer, a fourth reforming layer can be associated with the anode.

In various embodiments, the electrochemical cell can be substrate-supported, comprising a fourth layer associated with at least a portion of the third layer. In these embodiments, the first layer can be a substrate, the second and fourth layers can be electrodes and the third layer can be an electrolyte, creating a substrate-supported electrochemical cell. The substrate may be composed of ceramics, cermets, or metals. Additionally, a fifth layer can be associated with fourth layer, e.g., the fifth layer can be a reforming layer associated with an anode layer. Additionally, whole or partial reforming materials can be implemented in the support layer. Whole reforming implies that an incoming fuel can be completely reformed at the reforming layer located in the support layer. Partial reforming implies that the reforming layer located in the support layer only can reform part of the incoming fuel. The remainder of the incoming fuel could be, in some embodiments, reformed on the anode of the fuel cell.

In some embodiments, the fuel channel and the oxidant channel can be formed using the extrusion, gel-casting, or 3-D printing processes discussed above. In some embodiments, the channels can be made using pore formers. Pore formers are materials that can be destructively removed to create void channels in an object. Exemplary pore formers include but are not limited to: carbon-based materials, straws or textiles, including woven, knitted, knotted, tufted, tied or unwoven fiber, or fabric materials. The carbon, graphite, or other materials can be destructively removed through combustion, by dissolution with a solvent, or any other means known to one in skill in the art for removing a pore former from a ceramic or cermet without damaging the ceramic or cermet structure.

Another aspect of the present teachings relates to a method of operating an electrochemical cell. The method comprises causing a fuel to enter the fuel channel of the electrochemical cell and directing an oxidant into the oxidant channel of the electrochemical cell. The fuel can be hydrogen (when the anode does not have a reforming layer) or the fuel can be hydrocarbon mixtures that are reformed on the anode reforming layer. Depending on the type of reformer applied to the anode layer, the hydrocarbon mixture may be any form of gaseous or liquid hydrocarbons and the hydrocarbons that can be mixed with air (partial oxidation reforming) or steam (steam or autothermal reforming).

Figure 6:
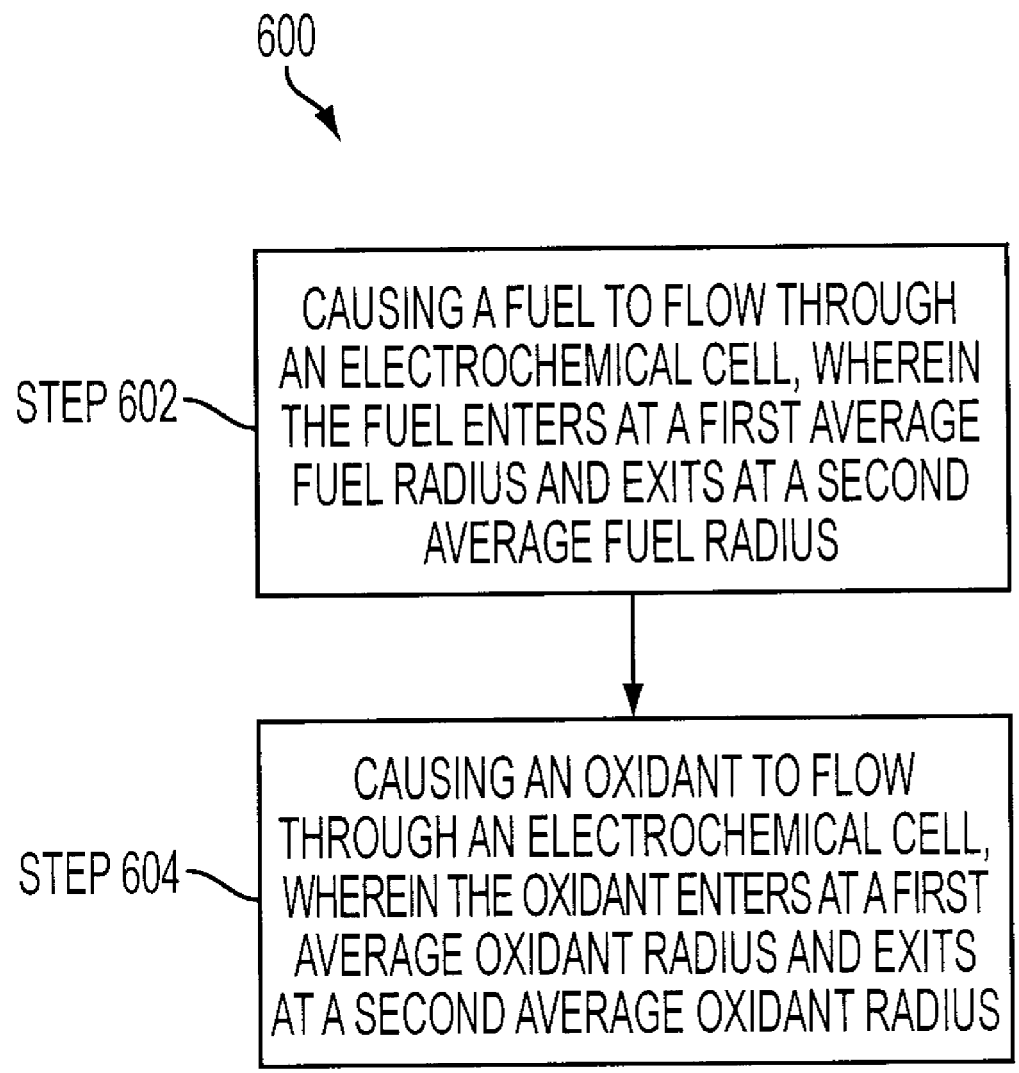
FIG. 6 is a high-level flow chart of an embodiment of a method of operating the electrochemical cell of the present teachings.

FIG. 6 is a high level flow chart of an exemplary method 600 of operating the electrochemical cell of the present teachings. Referring to both FIG. 4 and FIG. 6, the method 600 begins in step 602 as fuel enters the electrochemical cell at, for example, the first end 32. The fuel can be directed into the fuel channel 18 somewhat uniformly along the entire cross-section of the electrochemical cell. In another embodiment, the fuel can be directed into the fuel channel 18 at less than the entire cross-section of the electrochemical cell, such as solely in the vicinity of the radial center 26 of the electrochemical cell. In another example, the fuel can be directed into the electrochemical cell uniformly between the radial center 26 and the half radius 28, or at some other point in the radial cross-section of the electrochemical cell. Those skilled in the art will appreciate that directing the fuel at less than the entire cross-section of the cell can cause the fuel to diffuse radially outward as it passes longitudinally through the cell. For example, fuel introduced between the radial center 26 and the half radius 28 at the first end 32 can diffuse radially outward toward the radius 30 so that it exits the second end 36 at an average fuel radius greater than that at the first end 32. Those skilled in the art will appreciate that such radial diffusion can cause the concentration of fuel to vary along the length of the electrochemical cell. Although step 602 has been described in terms of fuel being introduced at the first end 32, those skilled in the art will appreciate that fuel can be introduced at the second end 36.

The fuel can be delivered to the electrochemical cell via any delivery mechanism known to one of skill in the art. For example, the fuel can be delivered into the electrochemical cell via a fuel pump or using the pressure contained within the fuel container.

Step 604 of the method 600 includes causing an oxidant to flow through an electrochemical cell, wherein the oxidant enters at a first average oxidant radius and exits at a second average oxidant radius. The oxidant can be introduced into the electrochemical cell in substantially the same manner as described above in reference to the fuel, but typically through the oxidant channel of the Fermat spiral.

The fuel and the oxidant each can be directed at the same end of the electrochemical cell or can be directed at opposite ends of the electrochemical cell. For example, the fuel can be directed into the fuel channel at the first end of the electrochemical cell and the oxidant can be directed into the oxidant channel at the second end.

In certain embodiments, the method of operating an electrochemical cell comprises directing a fluid having a concentration through a substantially cylindrical electrochemical cell of the present teachings. Because of the structure of the electrochemical cell, the concentration of the fluid varies radially along at least part of the axial length of the electrochemical cell. The fluid can be fuel, oxidant, or exhaust.

Referring to FIG. 4, those skilled in the art will appreciate that biasing the fuel stream (i.e., fuel) toward the radial center 26, as described above, can expose the fuel stream to an increasing anode surface area along at least a portion of the longitudinal axis of cell. For example, if the fuel stream is directed into the radial center of the Fermat spiral shaped electrochemical cell at the first end 32, the fuel stream may diffuse radially along the longitudinal axis of the cell and encounter more anode surface area with which to react. In that regard, those skilled in the art may also appreciate that directing a fuel stream at the radial center 26 may flatten the power profile of the cell.

Furthermore, the Fermat spiral design of the electrochemical cell can modulate the temperature as compared to a standard tubular electrochemical cell of equal size. For example, if the fuel and oxidant are directed into the electrochemical cell at the radial center of the electrochemical cell, the highest concentration of fuel and oxidant will be at the radial center of the cell. The fuel and oxidant will also be moving at a higher velocity at the radial center of the electrochemical cell than at the radial edge of the cell. Some of the fuel and oxidant will not react at the center of the cell, despite the high concentrations, because of the relatively high velocities of the fuel and the oxidant. Therefore, the likelihood that the center of the cell will reach excessive temperatures decreases, thus, reducing the likelihood of thermal shock to the electrochemical cell. As the oxidant and fuel move radially outward along the spiral, their respective velocities decrease. This decrease in velocity increases the resident time that the fuel and the oxidant have to react with the anode and cathode. Additionally, as the fuel and oxidant disperse radially, each is exposed to more electrochemically active surface area with which to react. Thus, the reaction rate at the center of the cell is not significantly higher than at outer edge of the cell. Because the reaction rate is directly related to the operating temperature of the electrochemical cell, the radial temperature profile of the electrochemical cell can be somewhat flatter than in a standard tubular cell. Additionally, the spiral shape of the electrochemical cell can accommodate radial expansion of the cell when the temperature of the cell increases during operation.

Embodiments of the present teachings also can significantly increase cell and stack volumetric power density relative to a standard tubular cell of similar outer dimensions. Because the fuel and the oxidant have an increased electrochemically active surface over which to react when compared with cells of similar outer dimensions, a larger percentage of fuel will react, thus producing more electricity with the same outer dimensioned electrochemical cell. For example, depending on the design, the electrochemical cell of the present teachings can generate an increased power output in the range of about a 50% to about a 300% power increase at the same operating conditions (i.e., fuel and oxidant flow rates, temperatures, electrical loading, and pressure.)

Other Embodiments

The present teachings can be embodied in other specific forms, not delineated above, without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that cone within the meaning and range of equivalency of the claims are intended to be embraced therein.

The invention claimed is:

1. An electrochemical cell comprising:
   an anode layer;
   a cathode layer; and
   an electrolyte layer interposed between the anode layer and the cathode layer, together forming a spiral multilayer member comprising an axial length and substantially cylindrical body, the electrolyte layer being in ionic or protonic communication with one of the anode layer and the cathode layer,
   wherein the spiral multilayer member forms a closed Fermat spiral that closes upon itself and defines a fuel channel bounded by the anode layer, and an oxidant channel bounded by the cathode layer that extends radially in the form of a spiral, and each of the fuel channel and the oxidant channel extends from a first end to a second end along the axial length of the spiral multilayer member and comprises a spiral cross-section.

2. The electrochemical cell of claim 1, wherein the anode layer further comprises a reforming layer.

3. The electrochemical cell of claim 1, wherein the anode layer, the electrolyte layer, and the cathode layer each has a width between about 5 µm and about 2,000 µm.

4. The electrochemical cell of claim 1, wherein the electrochemical cell is an anode-supported electrochemical cell, a cathode-supported electrochemical cell, an electrolyte-supported electrochemical cell, a metal-supported electrochemical cell, or a substrate-supported electrochemical cell.

5. The electrochemical cell of claim 1, wherein the fuel channel and the oxidant channel each have a width between about 0.1 mm and about 5 mm.

6. The electrochemical cell of claim 1, wherein the electrolyte layer comprises an ionic conductor or a protonic conductor.

7. The electrochemical cell of claim 1, wherein the electrochemical cell is a solid oxide fuel cell.

8. The electrochemical cell of claim 1, wherein the electrolyte layer comprises an ionic conductor and the electrochemical cell is an anode-supported solid oxide fuel cell.

9. The electrochemical cell of claim 8, wherein the anode layer has a width of about 0.5 mm to about 2 mm, the electrolyte layer has a width of about 5 µm to about 50 µm, and the cathode layer has a width of about 10 µm to about 100 µm.

10. The electrochemical cell of claim 8, wherein the anode layer comprises a porous nickel cermet comprising yttria-stabilized zirconia.

11. The electrochemical cell of claim 10, wherein the anode layer further comprises a reforming layer.

12. The electrochemical cell of claim 11, wherein the reforming layer comprises a partial oxidation reforming catalyst.

13. The electrochemical cell of claim 8, wherein the cathode layer comprises a perovskite.

14. The electrochemical cell of claim 1, wherein the fuel channel and the oxidant channel extend longitudinally along the entire axial length of the substantially cylindrical body of the spiral multilayer member.

* * * * *